United States Patent
Araki et al.

(10) Patent No.: US 6,353,955 B2
(45) Date of Patent: Mar. 12, 2002

(54) PRESSURE CONTROL VALVE AND EVAPORATION FUEL DISCHARGE CONTROL DEVICE

(75) Inventors: Shinji Araki; Satoshi Kimura, both of Tokyo; Hideaki Kanazawa, Tochigi, all of (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/769,267

(22) Filed: Jan. 26, 2001

Related U.S. Application Data

(62) Division of application No. 09/292,856, filed on Apr. 16, 1999, now Pat. No. 6,196,258.

(30) Foreign Application Priority Data

Apr. 16, 1998 (JP) ............................................. 10-106055
Aug. 3, 1999 (JP) ............................................... 11-59674

(51) Int. Cl.[7] ................................................ F02M 37/04
(52) U.S. Cl. ........................................... 13/516; 123/520
(58) Field of Search ................................ 123/516, 518, 123/519, 520, 521, 179.17; 137/587, 588, 43, 493.4, 493.5

(56) References Cited

U.S. PATENT DOCUMENTS

| | | | |
|---|---|---|---|
| 1,153,770 A | 9/1915 | Daymon | 137/493.5 |
| 1,620,720 A | 3/1927 | Buck | 137/630.22 |
| 2,191,636 A | 2/1940 | Walker | 137/493.4 |
| 3,971,406 A | 7/1976 | Inada et al. | 137/493.4 |
| 5,579,742 A * | 12/1996 | Yamazaki et al. | 123/520 |
| 5,584,278 A * | 12/1996 | Satoh et al. | 123/516 |
| 5,603,349 A * | 2/1997 | Harris | 137/588 |
| 5,640,993 A * | 6/1997 | Kasugai et al. | 137/587 |
| 5,657,734 A * | 8/1997 | Sawamoto et al. | 123/519 |
| 5,755,248 A * | 5/1998 | Szlaga et al. | 137/43 |
| 5,870,997 A * | 2/1999 | Mukai | 123/520 |
| 6,003,499 A * | 12/1999 | Devall et al. | 123/520 |
| 6,029,635 A * | 2/2000 | Sekine et al. | 123/516 |

FOREIGN PATENT DOCUMENTS

| | | | |
|---|---|---|---|
| GB | 1433441 | 4/1976 | 137/493.4 |
| JP | 1-83976 | 6/1989 | F16K/17/196 |
| JP | 8-189423 | 7/1996 | |

* cited by examiner

*Primary Examiner*—Carl S. Miller
(74) *Attorney, Agent, or Firm*—Sughrue Mion, PLLC

(57) ABSTRACT

The pressure control valve is structured such that a first port is formed on one side of a casing, a second port is formed on the other side, and, in the casing, there are disposed not only a positive pressure valve which, when the pressure on the first port side becomes high, can be moved to the second port side to thereby communicate with the second port side, but also a negative pressure valve which, when the pressure on the first port side becomes low, can be moved to the first port side to thereby communicate with the second port side. In the pressure control valve, there is provided flow passage expanding means which, which the positive pressure valve has moved to the second port side beyond a given distance, allows the first port side to communicate with the second port side. Further, the evaporation fuel discharge control device comprises first communicating means which allows the upstream side of a switch valve to communicate with an pressure introduction passage when the pressure on the upstream side of the switch valve is higher by a given value or more than the pressure on the pressure introduction passage side, and second communicating means which allows the upstream side of the switch valve to communicate with the pressure introduction passage when the pressure on the pressure introduction passage side is higher by a given value or more than the pressure on the upstream side of the switch valve.

5 Claims, 16 Drawing Sheets

PRESSURE CONTROL VALVE AND EVAPORATION FUEL DISCHARGE CONTROL DEVICE

This is a divisional of application Ser. No. 09/292,856, filed Apr. 16, 1999, now U.S. Pat. No. 6,196,258 the disclosure of which is incorporated herein by reference.

BACKGROUND OF THE INVENTION

1. Field of the Invention

The present invention relates to a pressure control valve. Further, the present invention relates an evaporation fuel discharge control device which, when fuel is supplied to a fuel tank of a car, is used to control the discharge of evaporation fuel from the fuel tank.

The present application is based on Japanese Patent Applications No. Hei. 10-106055 and 11-59674 which are incorporated herein by reference.

2. Description of the Related Art

Generally, in a car, evaporation fuel from a fuel tank is temporarily stored in a canister through an evapo-pipe, and is then introduced into an engine at a suitable time. A pressure-control valve is disposed in the evapo-pipe.

And, conventionally, as a pressure control valve which is used in such pipe, for example, there is known a pressure control valve which is disclosed in Japanese Utility Model Publication No. Hei. 1-83976.

FIG. 17 shows the pressure control valve that is disclosed in the above-cited publication. That is, the pressure control valve comprises a cap 202 which includes a first port 201 in communication with a fuel tank, and a body 204 including a second port 203 in communication with a canister.

The body 204 includes a partition wall 205 in the interior portion thereof; and, in particular, between the upper surface of the partition wall 205 and the inner surface of the cap 202, there is interposed a first valve 206, and, inside the first valve 206, in particular, between the upper surface of the partition wall 205 and a valve body 207, there is interposed a second valve 208.

And, in the portion of the partition wall 205 that is situated on the inner side of the second valve 208, there is formed a fluid passage 209.

However, in the above-structured conventional pressure control valve, since the fluid passage 209 is formed only in the portion of the partition wall 205 that is situated on the inner side of the second valve 208, when the pressure within the fuel tank increases suddenly, it is difficult to introduce the evaporation fuel within the fuel tank through the first and second ports 201 and 203 to the canister side quickly.

Further, as an evaporation fuel discharge control device which, when fuel is supplied to a fuel tank of a car, is used to control the discharge of evaporation fuel from the fuel tank, for example, there is known a device which is disclosed in Japanese Patent Publication No. Hei. 8-189423.

Now, FIG. 18 shows the evaporation fuel discharge control device disclosed in the above-cited patent publication. In this evaporation fuel discharge control device, a tank main body 302 of a fuel tank 301 is connected to a canister 303 through an evaporation fuel passage 304.

Within the tank main body 302, there is disclosed a float valve 306 which is used to close an entrance portion 305 of the evaporation fuel passage 304 when fuel within the tank main body 302 exceeds a given liquid level.

And, in the evaporation fuel passage 304, there is disposed a switch valve assembly 307.

The switch valve assembly 307 has a diaphragm valve which divides a positive pressure chamber 307a and a back pressure chamber 307b, while the evaporation fuel passage 304 includes the positive pressure chamber 307a.

And, when the pressure on the positive pressure chamber 307a side is higher by a predetermined value or more than the pressure on the back pressure chamber 307b side, the evaporation fuel passage 304 is opened.

On the back pressure chamber 307b side of the switch valve assembly 307, there is opened a pressure introduction passage 309 which is connected to an entrance portion 308a of a fuel supply pipe 308.

And, the portion of the evaporation fuel passage 304 on the upstream side of the switch valve assembly 307 is connected to the pressure introduction passage 309 by a communicating passage 310.

In the communicating passage 310, there is disposed a check valve 311 which is structured such that it can be opened when the pressure on the upstream side of the switch valve assembly 307 is higher by a given value or more than the pressure on the pressure introduction passage 309 side.

In the evaporation fuel discharge control device of this type, if a cap (not shown) of the fuel supply pipe is removed when starting fuel supply, then the pressure on the back pressure chamber 307b side of the switch valve assembly 307 is reduced down by the predetermined value or more than the pressure on the positive pressure chamber 307a side of the switch valve assembly 307 through the pressure introduction passage 309 to thereby open the switch valve assembly 307, so that the evaporation fuel from the tank main body 302 is fed through the evaporation fuel passage 304 and is stored to the canister 303.

And, if the internal pressure of the tank main body 302 is increased due to start of the fuel supply and the upstream side pressure of the switch valve assembly 307 is thereby increased by the given value or more than the pressure on the pressure introduction passage 309 of the check valve 311, then the check valve 311, which is disposed in the communicating passage 310, is caused to open. As a result of this, a part of the evaporation fuel within the tank main body 302 is introduced through the pressure introduction passage 309 into the entrance portion 308a of the fuel supply pipe 308 and is then returned back into the tank main body 302 together with fuel which is supplied from a fuel supply gun 312.

And, if the tank main body 302 is filled with fuel, then the entrance portion 305 of the evaporation fuel passage 304 is closed by the float valve 306, with the result that the pressure on the upstream side of the switch valve assembly 307 with the communication thereof with respect to the interior portion of the tank main body 302 cut off is caused to decrease quickly to thereby close the switch valve assembly 307 and check valve 311.

And, if the cap (not shown) is mounted on the fuel supply pipe 308 after completion of the fuel supply, then the pressure of the entrance portion 308a of the fuel supply pipe 308 increases together with and equally to the pressure of the interior portion of the tank main body 302, so that the pressure on the back pressure chamber 307b side of the switch valve assembly 307 is caused to increase through the pressure introduction passage 309 and the pressure of the check valve 311 on the pressure introduction passage 309 side thereof is also caused to increase.

However, in the above-mentioned conventional evaporation fuel discharge control device, because, if the interior portion of the tank main body 302 is filled with the fuel, then not only the entrance portion 305 of the evaporation fuel passage 304 is closed by the float valve 306 but also the switch valve assembly 307 and check valve 311 are closed, the pressure on the upstream side of the switch valve assembly 307 remains as pressure equivalent to the atmospheric pressure, which causes the float valve 306 to stick to the entrance portion 305 of the evaporation fuel passage 304.

Therefore, conventionally, in order to prevent the float valve 306 from sticking to the entrance portion 305 of the evaporation fuel passage 304, for example, the float valve 306 is divided in two upper and lower stages. However, in this case, there arise other problems: that is, the float valve 306 is complicated in structure, the manufacturing cost thereof is increased, and the response property thereof is lowered.

SUMMARY OF THE INVENTION

The present invention aims at the above-mentioned problems found in the conventional pressure control valve. Accordingly, it is an object of the invention to provide a pressure control valve which, when the pressure on the first port side increases suddenly, can flow a large quantity of fluid to the second port side.

It is another object of the invention to provide an evaporation fuel discharge control device which is able to prevent easily and positively a float valve from sticking to the entrance portion of an evaporation fuel passage.

In attaining the above objects, according to a first aspect of the present invention, there is provided a pressure control valve. In the pressure control valve, a casing has a first port formed on a first side of the casing, a second port formed on a second side. A positive pressure valve is disposed in the casing, the positive pressure valve moving to a side of the second port to thereby communicating with the side of the second port when a pressure on a side of the first port becomes higher than the side of the second port. A negative pressure valve is disposed in the casing, the negative pressure valve moving to the side of the first port to thereby communicating with the side of the second port when the pressure on the side of the first port becomes lower than the side of the second port. Further, flow passage expanding means is provided which, when the positive pressure valve has moved to the side of the second port beyond a given distance, allows the side of the first port to communicate with the side of the second port by opening the negative pressure valve.

Preferably, the positive pressure valve is formed as a cylindrical-shaped bottomed valve having an opening on the bottom of the first port. The negative pressure valve has a rod portion extending through a bottom surface portion of the positive pressure valve, a valve portion stored within the positive pressure valve and connected to a first end of the rod portion, and an energizing portion connected to a second end of the rod portion for energizing the rod portion to the side of the second port. Further, on the side of the second port of the casing, a projecting portion is formed which, when the positive pressure valve has moved to the side of the second port beyond a given distance, can be contacted with the energizing portion of the negative pressure valve to thereby allow the negative pressure valve to communicate with the side of the second port.

Further, the first port can be connected to a fuel tank, whereas the second port can be connected to a canister.

In the above pressure control valve, if the pressure on the first port side increases suddenly, then the positive pressure valve is moved to the second port side beyond a given distance to thereby allow the negative pressure valve to communicate with the second port side, so that the fluid or fuel from the first port side is allowed to flow to the second port through the respective flow passages of the positive and negative pressure valves.

Also, if the pressure on the first port side increases suddenly, then the positive pressure valve is moved to the second port side together with the negative pressure valve, and, when the positive pressure valve has moved to the second port side beyond a given distance, the projecting portion formed in the casing is contacted with the energizing portion of the negative pressure valve to thereby allow the negative pressure valve to communicate with the second port side.

In attaining the above objects, according to a second aspect of the present invention, there is provided an evaporation fuel discharge control device. A canister for adsorbing evaporation fuel from a fuel tank has a tank main body with a fuel supply pipe, an evaporation fuel passage for connecting the tank main body and the canister, and a float valve is disposed within the tank main body for closing an entrance portion of the evaporation fuel passage when fuel within the tank main body exceeds a given liquid level. Further, a switch valve includes a positive pressure chamber and a back pressure chamber, the evaporation fuel passage being disposed on a side of the positive pressure chamber, and the switch valve is structured such that it can be opened when a pressure on the side of the positive pressure chamber is higher by a predetermined value or more than a pressure on a side of the back pressure chamber. A pressure introduction passage for connecting an entrance portion of the fuel supply pipe to the back pressure chamber of the switch valve is provided. First communicating means allows an upstream side of the switch valve to communicate with the pressure introduction passage when a pressure on the upstream side of the switch valve is higher by a given value or more than a pressure on a side of the pressure introduction passage. Second communicating means allows the upstream side of the switch valve to communicate with the pressure introduction passage when the pressure on the side of the pressure introduction passage is higher by a given value or more than the pressure on the upstream side of the switch valve.

Preferably, the first and second communicating means include a positive pressure valve and a negative pressure valve to be stored within a valve chamber which is formed integrally with the switch valve, and the negative pressure valve is disposed in the positive pressure valve.

Preferably, the evaporation fuel discharge control device further includes passage expansion means disposed so as to be opposed to the pressure introduction passage and capable of opening the negative pressure valve when the positive pressure valve is moved beyond a given distance toward an opening of the pressure introduction passage, the opening of the pressure introduction passage being opened in the valve chamber.

In an evaporation fuel discharge control device according to the invention, on completion of fuel supply, if the cap is mounted on the fuel supply pipe, then the pressure of the entrance portion of the fuel supply pipe increases up to the same level as the pressure within the tank main body, and thus the second communicating means is opened through the pressure introduction passage to thereby increase the pressure on the upstream side of the switch valve up to almost the same level as the pressure within the tank main body, thereby removing the sticking of the float valve to the entrance portion of an evaporation fuel passage.

Also, in an evaporation fuel discharge control device, the positive pressure valve of the first communicating means and the negative pressure valve of the second communicating means are stored within the valve chamber which is formed integrally with the switch valve, and the negative pressure valve is disposed in the positive pressure valve.

Further, if the positive pressure valve is moved, due to the high pressure used in the high flow rate of fuel supply, beyond a given distance toward the opening side of the pressure introduction passage which is opened in the valve chamber, then the negative pressure valve can be opened and the area of the passage toward the pressure introduction passage can be expanded by the passage expanding means.

Features and advantages of the invention will be evident from the following detailed description of the preferred embodiments described in conjunction with attached drawings.

DETAILED DESCRIPTION OF THE PREFERRED EMBODIMENTS

Now, description will be given below in detail of an embodiment of a pressure control valve according to the invention with reference to the accompanying drawings.

Figure 1:
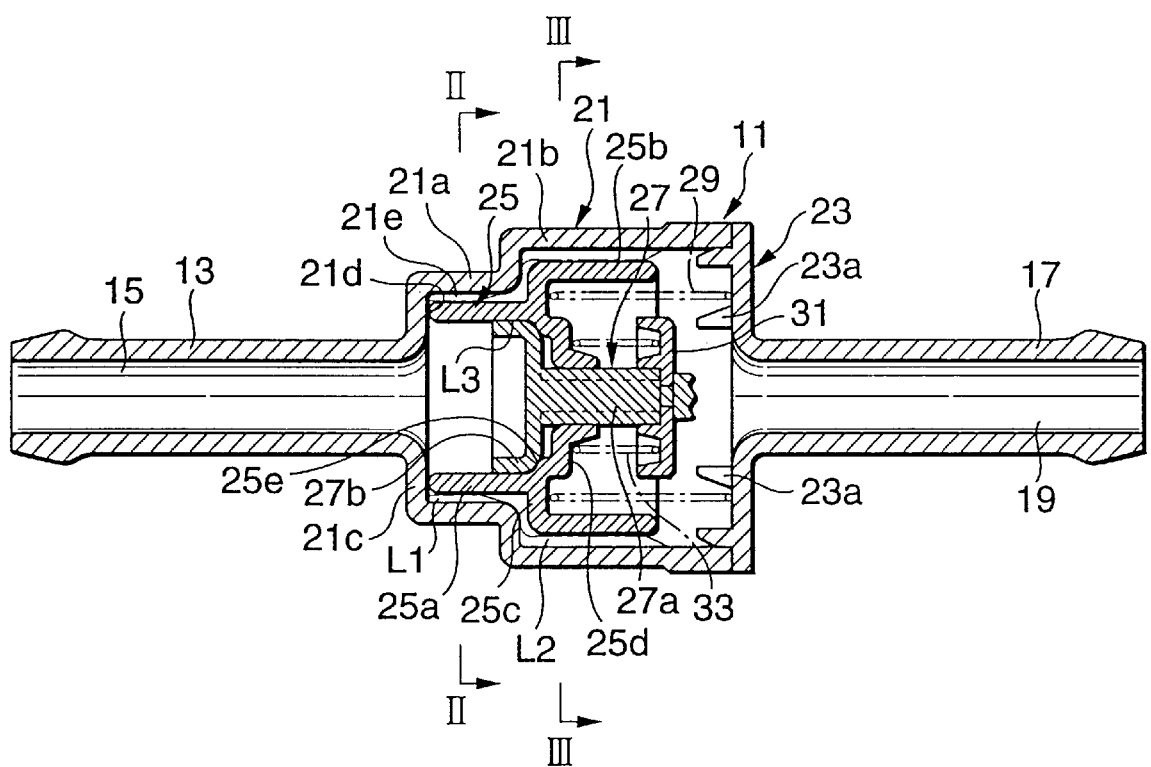
FIG. 1 is a longitudinal section view of an embodiment of a pressure control valve according to the invention.
Figure 2:
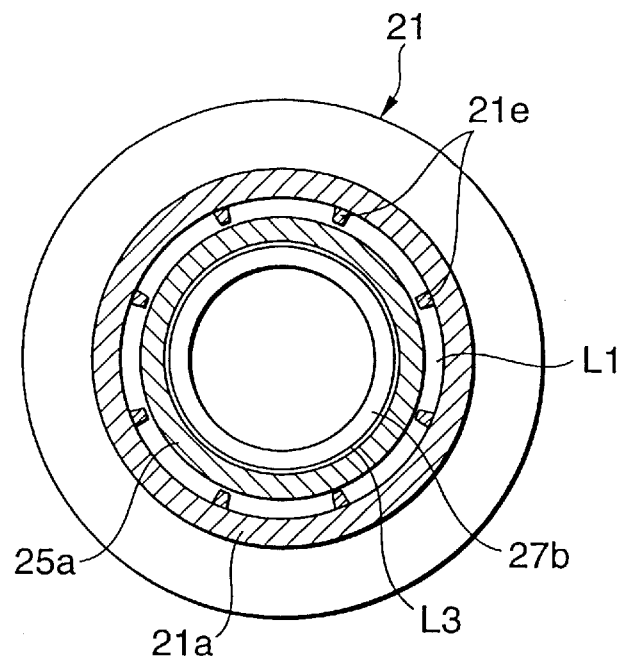
FIG. 2 is a transverse section view of the pressure control valve shown in FIG. 1, taken along the line II—II shown in FIG. 1.
Figure 3:
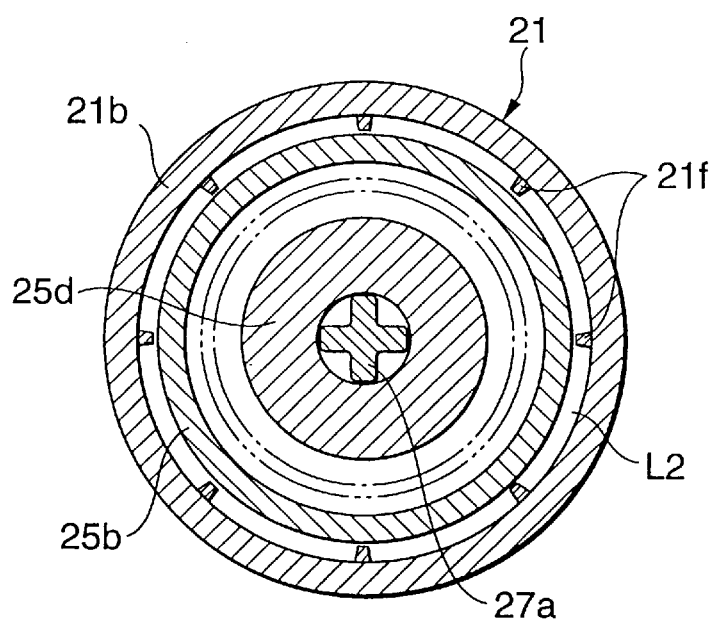
FIG. 3 is a transverse section view of the pressure control valve shown in FIG. 1, taken along the line III—III shown in FIG. 1.

FIGS. 1 to 3 respectively show an embodiment of a pressure control valve according to the invention.

In use, a pressure control valve according to the present embodiment is disposed in an evapo-pipe which is used to connect together the fuel tank and canister of a car.

In FIG. 1, a casing 11 includes on one side thereof a first pipe conduit portion 13, while the interior portion of the first pipe conduit portion 13 is used as a first port 15.

Also, the casing 11 includes on the other side thereof a second pipe conduit portion 17, while the interior portion of the second pipe conduit portion 17 is used as a second port 19.

And, the casing 11 comprises a cylindrical-shaped portion 21 with which the first pipe conduit portion 13 is formed integrally, and a cover portion 23 with which the second pipe conduit portion 17 is formed integrally. The casing 11 can be produced by connecting together the cylindrical-shaped portion 21 and cover portion 23 by ultrasonic welding or by other means.

Within the casing 11, there is disposed a positive pressure valve 25 structured such that, when the pressure on the first port 15 side becomes high, it can be moved toward the second port 19 side to thereby allow the first port 15 side to communicate with the second port 19 side.

Also, within the positive pressure valve 25, there is disposed a negative pressure valve 27 structured such that, when the pressure on the first port 15 side becomes low, it can be moved toward the first port 15 side to thereby allow the second port 19 side to communicate with the first port 15 side.

In the present embodiment, the cylindrical-shaped portion 21 comprises a small diameter portion 21a and a large diameter portion 21b, while a valve portion 25a of the positive pressure valve 25 is situated in the small diameter portion 21a of the cylindrical-shaped portion 21.

And, there is formed a stepped portion 21c between the first pipe conduit portion 13 and small diameter portion 21a, and, in the stepped portion 21c, there is formed a positive pressure seal surface 21d. If the valve portion 25a of the positive pressure valve 25 is contacted with the positive pressure seal surface 21d, then the sealing operation to be executed by the positive pressure valve 25 can be attained.

On the inner surface of the small diameter portion 21a of the cylindrical-shaped portion 21, as shown in FIG. 2, there are provided a plurality of projection portions 21e spaced at given angular intervals, whereby there is formed a passage portion L1 between the small diameter portion 21a and valve portion 25a.

On the inner surface of the large diameter portion 21b of the cylindrical-shaped portion 21, there is disposed a guide portion 25b of the positive pressure valve 25.

This guide portion 25b is formed integrally with the valve portion 25a.

On the inside portion of the large diameter portion 21b of the cylindrical-shaped portion 21, as shown in FIG. 3, there are provided a plurality of projection portions 21f spaced at given angular intervals, whereby there is formed a passage portion L2 between the large diameter portion 21b and guide portion 25b.

Between the valve portion 25a and guide portion 25b of the positive pressure valve 25, there is formed a stepped portion 25c; and, between the stepped portion 25c and cover portion 23, there is disposed a coiled spring 29 which is used to energize the positive pressure valve 25 toward the first port 15 side.

The positive pressure valve 25 is formed in a cylindrical-shaped bottomed valve which includes a passage portion.

And, a rod portion 27a of the negative pressure valve 27 is inserted through the bottom surface portion 25d of the positive pressure valve 25.

The rod portion 27a is structured such that, as shown in FIG. 3, it has a cross-shaped section in a sectional view.

On the first port 15 side of the rod portion 27a, there is arranged a valve portion 27b of the negative pressure valve 27 in such a manner that it is formed integrally with the rod portion 27a.

The valve portion 27b of the negative pressure valve 27 is stored within the valve portion 25a of the positive pressure valve 25.

The outside diameter of the valve portion 27b of the negative pressure valve 27 is set smaller than the inside diameter of the valve portion 25a of the positive pressure valve 25 and, between the valve portion 27b and 25a, there is formed a passage portion L3.

Between the valve portion 25a and bottom surface portion 25d of the positive pressure valve 25, there is formed a negative pressure seal surface 25e. That is, if the valve portion 27b of the negative pressure valve 27 is contacted with the negative pressure seal surface 25e, then a sealing operation to be executed by the negative pressure valve 27 can be accomplished.

An energizing portion 31, which is used to energize the rod portion 27a of the negative pressure valve 27 toward the second port 19 side, is fixed to the other end of the rod portion 27a by thermal welding or by other means.

Between the energizing portion 31 and the bottom surface portion 25d of the positive pressure valve 25, there is interposed a coiled spring 33 which is used to energize the energizing portion 31 toward the second port 19 side.

And, according to the present embodiment, in the cover portion 23 of the casing 11, there are provided projecting portions 23a which, when the positive pressure valve 25 has moved toward the second port side 19 beyond a given distance, can be contacted with the energizing portion 31 of the negative pressure valve 27 to thereby allow the first port side to communicate with the second port 19 side by opening the negative pressure valve 27.

The projecting portions 23a are provided on and formed integrally with the inner surface of the cover portion 23 at a given angle from the center of the cover portion 23, for example, at six positions of the cover portion 23 inner surface.

Figure 4:
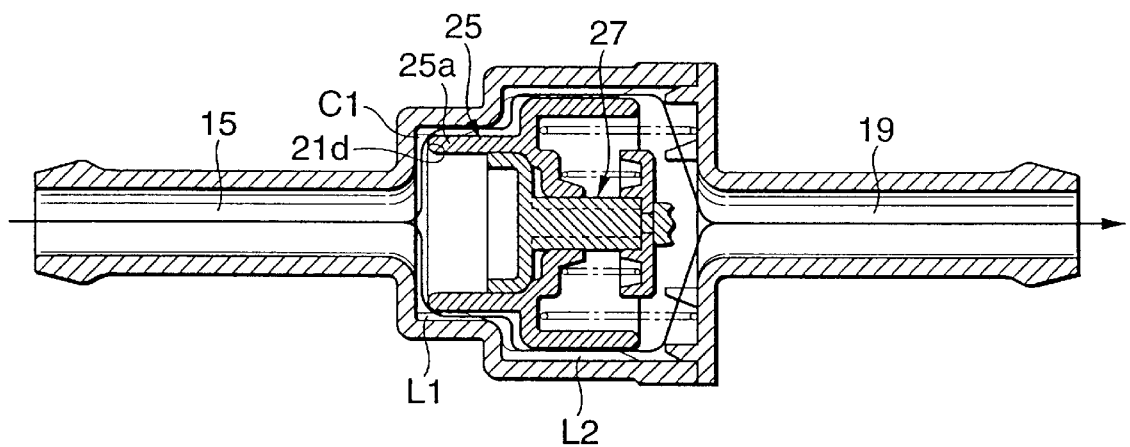
FIG. 4 is a longitudinal section view of the pressure control valve shown in FIG. 1, showing a positive pressure state thereof.

According to the above-mentioned pressure control valve, if the pressure of the first port 15 on the fuel tank side becomes more positive than the pressure of the second port 19 on the canister side, as shown in FIG. 4, the positive pressure valve 25 is moved toward the second port 19 side to thereby form a gap C1 between the positive pressure seal surface 21d of the cylindrical-shaped portion 21 and the valve portion 25a of the positive pressure valve 25, with the result that the fuel of the first port 15 side is allowed to flow through the gap C1, passage portion L1 and passage portion L2 to the second port 19 side.

Figure 5:
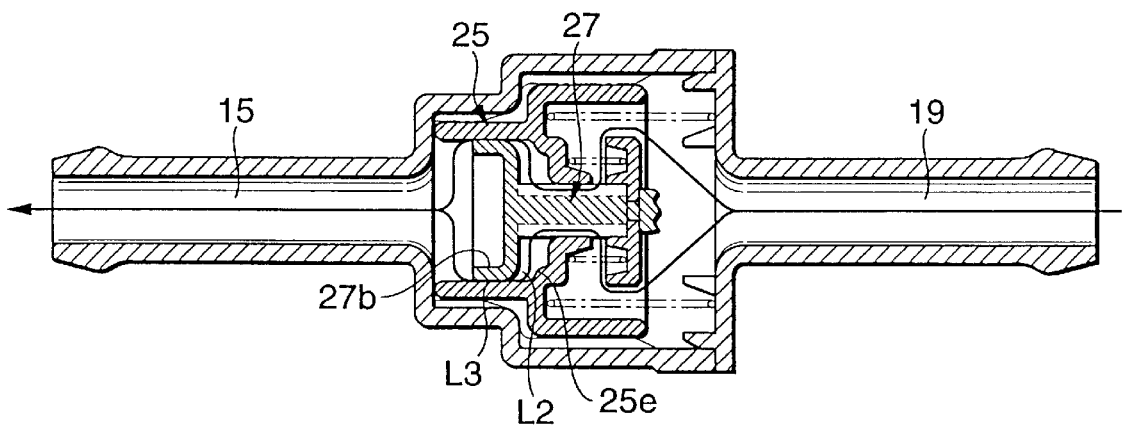
FIG. 5 is a longitudinal section view of the pressure control valve shown in FIG. 1, showing a negative pressure state thereof.

On the other hand, if the pressure of the first port 15 on the fuel tank side becomes more negative than the pressure of the second port 19 on the canister side, as shown in FIG. 5, the negative pressure valve 27 is moved toward the first port 15 side to thereby form a gap C2 between the negative pressure seal surface 25e of the positive pressure valve 25 and the valve portion 27b of the negative pressure valve 27, with the result that the fuel of the second port 19 is allowed to flow through the gap C2 and passage portion L3 to the first port 15 side.

Figure 6:
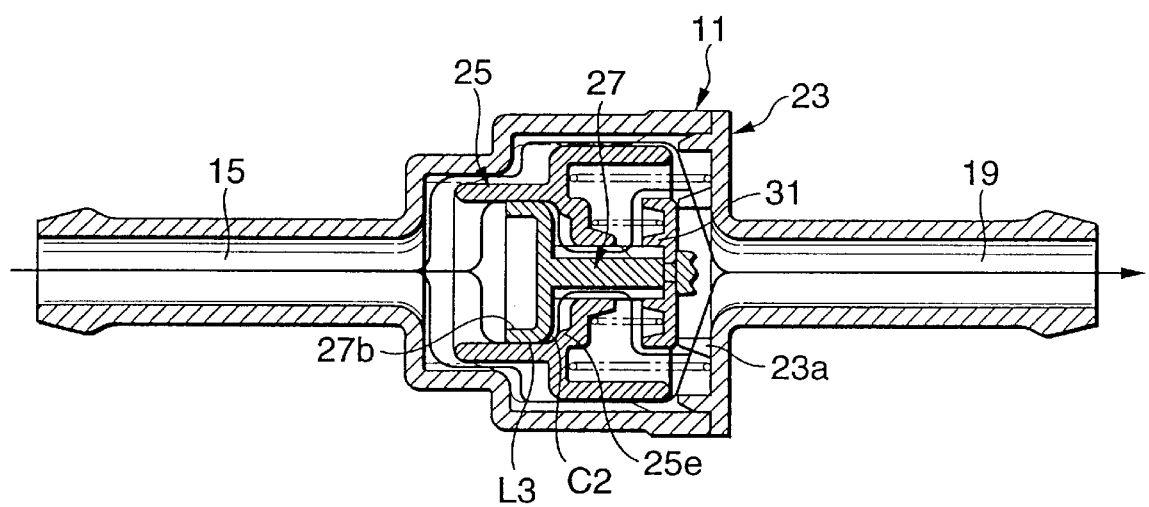
FIG. 6 is a longitudinal section view of the pressure control valve shown in FIG. 1, showing a state thereof in which the positive pressure thereof increases suddenly.

And, if the pressure within the fuel tank, that is, the pressure on the first port 15 side increases suddenly, as shown in FIG. 6, the positive pressure valve 25 is moved to the second port 19 side together with the negative pressure valve 27, so that, similarly to the case shown in FIG. 4, the fuel is allowed to flow from the first port 15 side to the second port 19 side.

And, at the then time, since the positive pressure valve 25 has been moved to the second port 19 side beyond a given distance, the projecting portions 23a of the cover portion 23 of the casing 11 are contacted with the energizing portion 31 of the negative pressure valve 27 and thus the negative pressure valve 27 is caused to move to the first port 15 side, thereby forming the gap C2 between the negative pressure seal surface 25e of the positive pressure valve 25 and the valve portion 27b of the negative pressure valve 27, with the result that the fuel of the first port 15 is allowed to flow through the passage portion L3 and gap C2 to the second port 19 side.

As described above, the present pressure control valve is structured such that, when the positive pressure valve 25 has moved to the second port 19 side beyond a given distance, the first port 15 side is allowed to communicate with the second port 19 side by opening the negative pressure valve 27. Thanks to this, if the pressure on the first port 15 side increases suddenly, then the positive pressure valve 25 is moved to the second port 19 side beyond a given distance, and the negative pressure valve 27 is thereby allowed to communicate with the second port 19 side, so that the fluid or fuel from the first port 15 is allowed to flow to the second port 19 through the respective flow passages of the positive and negative pressure valves 25 and 27.

Therefore, when the pressure on the first port 15 side increases suddenly, a large quantity of fluid can be made to flow to the second port 19 side.

Also, according to the above-mentioned pressure control valve, if the pressure on the first port 15 side increases suddenly, then the positive pressure valve 25 is moved to the second port 19 side together with the negative pressure valve 27, and, when the positive pressure valve 25 has moved to the second port 19 side beyond a given distance, the projecting portions 23a of the casing 11 are contacted with the energizing portion 31 of the negative pressure valve 27 to thereby allow the first port 15 side to communicate with the second port 19 side. That is, the flow passage expanding means can be structured easily and positively.

Further, according to the above-mentioned pressure control valve, since the first port 15 is connected to the fuel tank side, while the second port 19 is connected to the canister side, when the pressure within the fuel tank increases suddenly, the fuel within the fuel tank can be introduced to the canister side quickly.

By the way, in the above-mentioned embodiment, description has been given of an embodiment in which the pressure control valve of the invention is disposed in the evapo-pipe of a car. However, the invention is not limited to the present embodiment but the invention can be applied widely in other various piping systems.

Next, a description will be given below in detail of the preferred embodiments of an evaporation fuel discharge control device according to the invention with reference to the accompanying drawings.

Figure 7:
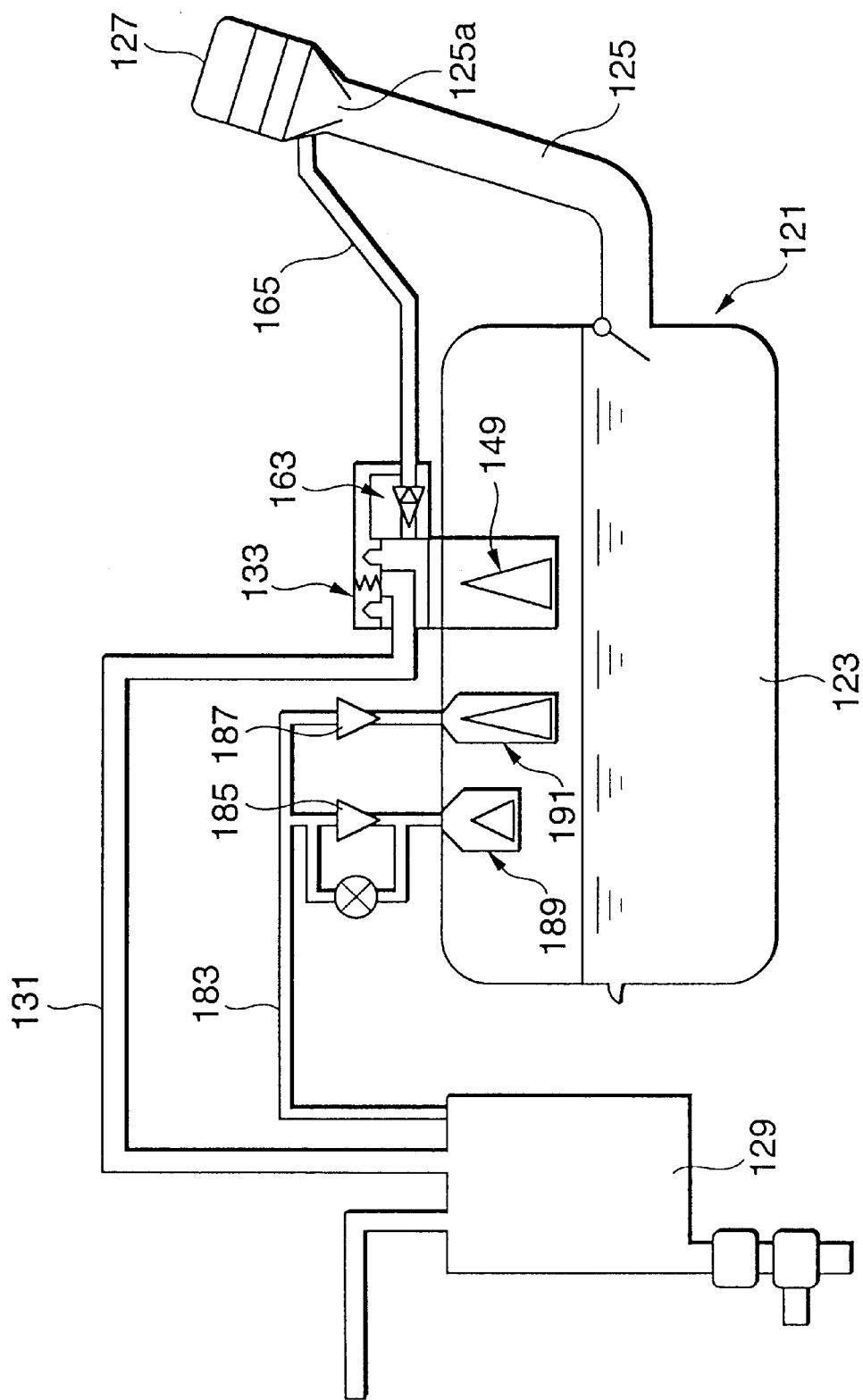
FIG. 7 is an explanatory view of a pipe arrangement system employed in an embodiment of an evaporation fuel discharge control device according to the invention.

In particular, FIG. 7 shows an embodiment of an evaporation fuel discharge control device according to the invention.

In FIG. 7, reference character 121 designates a fuel tank.

This fuel tank 121 comprises a tank main body 123 and a fuel supply pipe 125.

Within the tank main body 123, there is stored volatile fuel such as gasoline, light oil or the like.

A cap 127 is mounted on the entrance portion 125a of the fuel supply pipe 125.

In FIG. 7, reference character 129 designates a canister which is used to adsorb evaporation fuel from the fuel tank 121.

To the canister 129, there is connected an evaporation fuel passage 131 which extends from the tank main body 123.

The evaporation fuel passage 131 is opened on the upper surface of the tank main body 123 through a switch valve 133.

Figure 8:
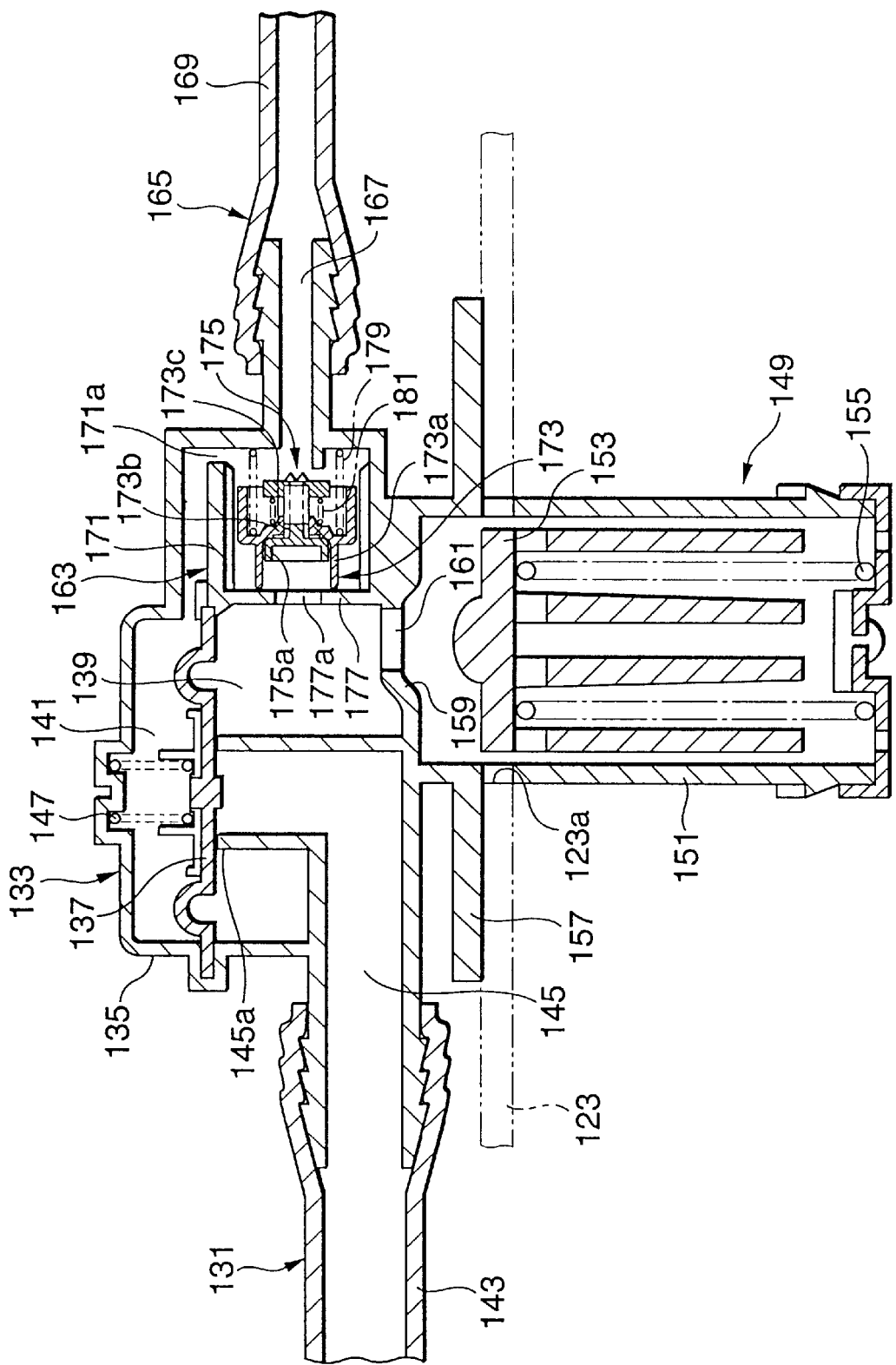
FIG. 8 is an enlarged section view of the main portions of the evaporation fuel discharge control device shown in FIG. 7.

The switch valve 133, as shown in FIG. 8, is a diaphragm valve which includes a diaphragm 137 within a valve main body 135 thereof.

That is, the interior portion of the valve main body 135 of the switch valve 133 is divided by the diaphragm 137 to thereby form a positive pressure chamber 139 and a back pressure chamber 141.

Within the positive pressure chamber 139 of the valve main body 135, there is formed a passage 145 which is connected through a pipe 143 to the canister 129 and forms part of the evaporation fuel passage 131.

The passage 145 is bent toward the diaphragm 137 side and includes a valve seat 145a on the diaphragm 137 side end thereof.

On the other hand, on the back pressure chamber 141 side, there is arranged a coiled spring 147 which energizes the diaphragm 137 toward the valve seat 145a of the passage 145.

And, the switch valve 133 is structured such that it can be opened when the pressure on the positive pressure chamber 139 side is higher by a predetermined value or more than the pressure on the back pressure chamber 141 side, whereas it is closed in other pressure conditions.

On the lower surface of the valve main body 135 of the switch valve 133, there is disposed a float valve 149.

The float valve 149 includes a cylindrical-shaped guide portion 151 which is formed integrally with the valve main body 135, and a float 153 which is to be stored within the guide portion 151.

The float 153 is energized upwardly by a coiled spring 155.

In the upper portion of the guide portion 151 of the float valve 149, there is formed a flange portion 157.

And, the flange portion 157 of the float valve 149 is fixed to the upper surface of the tank main body 123, with the guide portion 151 of the float valve 149 inserted through a through hole 123a which is formed in the tank main body 123.

The guide portion 151 of the float valve 149 is separated from the positive pressure chamber 139 of the switch valve 133 by a partition portion 159 which is formed integrally with the valve main body 135 of the switch valve 133.

In the partition portion 159, there is formed a through hole which provides an entrance portion 161 of the evaporation fuel passage 131.

And, when the fuel within the tank main body 123 of the fuel tank 121 exceeds a given liquid level, the upper end of the float 153 is contacted with the entrance portion 161 of the evaporation fuel passage 131 to thereby close the entrance portion 161 of the evaporation fuel passage 131.

On the other hand, according to the present embodiment, at the adjoining position of the valve main body 135 of the switch valve 133, a valve chamber 163 is formed integrally with the valve main body 135.

In the valve chamber 163, there is opened a pressure introduction passage 165 which is in communication with the entrance portion 125a of the fuel supply pipe 125.

That is, in the valve chamber 163, there is formed a passage 167, and a pipe 169 is connected to the passage 167, whereby the pressure introduction passage 165 is formed.

In the upper portion of the valve chamber 163, there is formed a partition portion 171.

And, through a hole portion 171a which is formed in the partition portion 171, the valve chamber 163 is allowed to be in communication with the back pressure chamber 141 side of the switch valve 133.

According to the present embodiment, within the valve chamber 163, there are disposed a positive pressure valve 173 forming first communicating means and a negative pressure valve 175 forming second communicating means.

That is, the positive pressure valve 173 allows the positive pressure chamber 139 side of the switch valve 133 to communicate with the pressure introduction passage 165 when the pressure on the positive pressure chamber 139 side is higher by a given valve or more than the pressure on the pressure introduction passage 165.

Also, the negative pressure valve 175 allows the entrance portion 161 of the evaporation fuel passage 131 to communicate with the pressure introduction passage 165 when the pressure on the pressure introduction passage 165 is higher by a given value or more than the pressure of the entrance portion 161.

Figure 9:
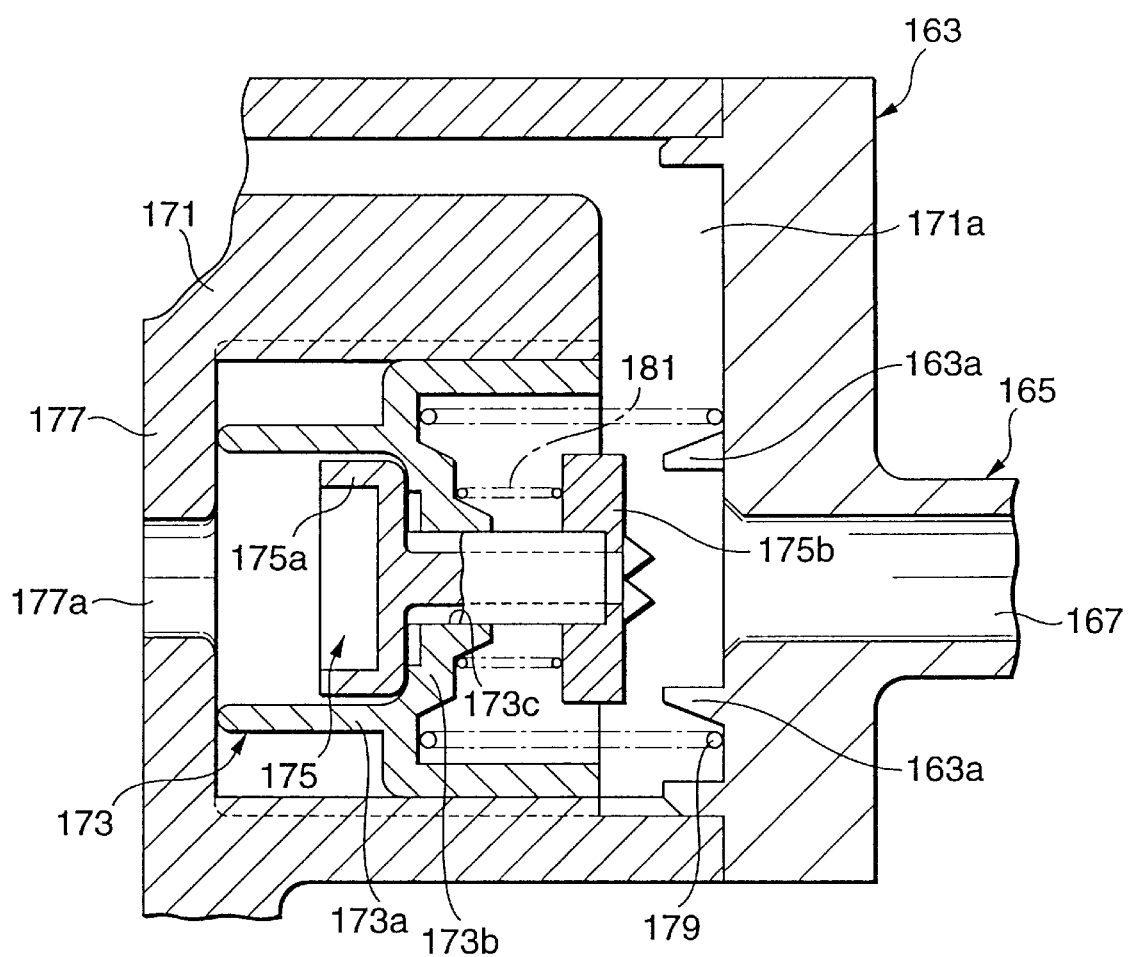
FIG. 9 is an enlarged section view of the valve chamber employed in the evaporation fuel discharge control device shown in FIG. 7.

In the present embodiment, as shown in FIG. 9, there is opened up a through hole 177a in a partition portion 177 which is formed between the positive pressure chamber 139 and valve chamber 163.

And, at a position which is outward in the diameter direction of the through hole 177a, there is arranged a cylindrical-shaped valve body 173a of a positive pressure valve 173.

The valve main body 173a of the positive pressure valve 173 is energized toward the partition portion 177 by a coiled spring 179 and, if the valve main body 173a is contacted with the partition portion 177, then the positive pressure valve 173 is closed.

On the other hand, in the bottom surface 173b of the valve main body 173a of the positive pressure valve 173, there is formed a through hole 173c and, in the through hole 173c, there is disposed a negative pressure valve 175.

Within the valve main body 173a of the positive pressure valve 173, at a position thereof which is located outward in the diameter direction of the through hole 173c, there is disposed a cylindrical-shaped valve main body 175a of the negative pressure valve 175.

The valve main body 175a of the negative pressure valve 175 is energized toward a passage 167 side by a coiled spring 181 and, if the valve main body 175a is contacted with the bottom surface 173b, then the negative pressure valve 175 is closed.

And, in the present embodiment, on the opposite side of the valve main body 175a of the negative pressure valve 175, there is arranged an energizing portion 175b and, at positions of the valve chamber 163 which are respectively opposed to the energizing portion 175b of the negative pressure valve 175, there are formed projecting portions 163a which serve as flow passage expansion means.

The projecting portions 163a are respectively formed at an angle of, for example, 60° with the passage 167 between them and, when the positive pressure valve 173 moves beyond a given distance toward the passage 167 side, the project portions 163a are butted against the energizing portion 175b of the negative pressure valve 175.

By the way, in FIG. 7, reference character 183 designates an evaporation fuel passage which is used to introduce the evaporation fuel within the fuel tank 121 to the canister 129 in other operations than in the fuel supply operation.

In the evaporation fuel passage 183, there are disposed positive and negative pressure valves 185, 187 and, in the entrance portion of the evaporation fuel passage 183, there are disposed float valves 189, 191.

Figure 10:
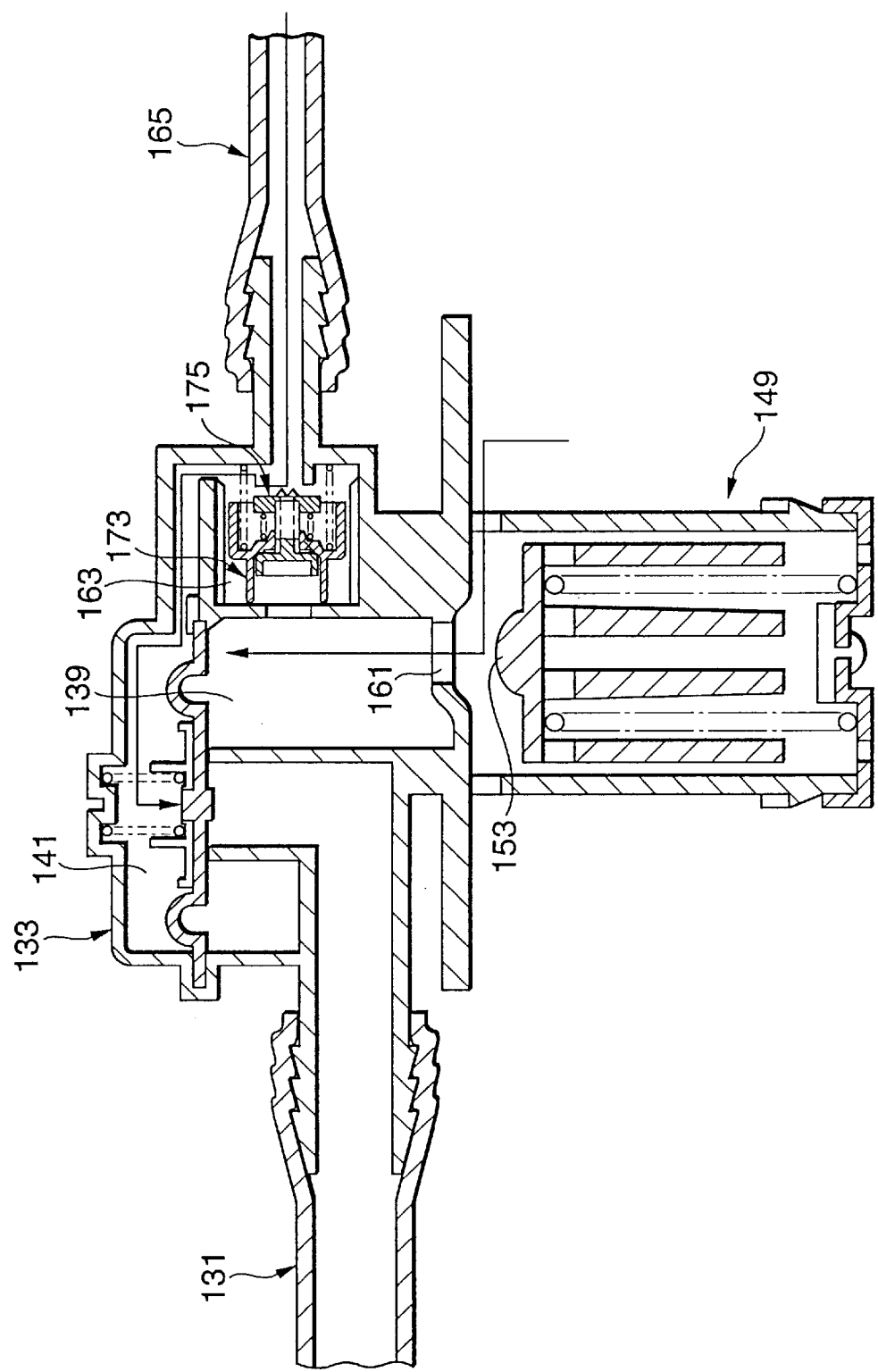
FIG. 10 is an explanatory view of the evaporation fuel discharge control device shown in FIG. 7, showing the state of the main portions thereof in a car normal running operation.

In the above-mentioned evaporation fuel discharge device, in a car normal running operation, since the pressure of the interior portion of the tank main body 123 is equal to the pressure of the interior portion of the fuel supply pipe 125, the pressure on the positive pressure chamber 139 side of the switch valve 133 is equal to the pressure on the back pressure chamber 141 side thereof and, therefore, as shown in FIG. 10, the switch valve 133 is closed.

Figure 11:
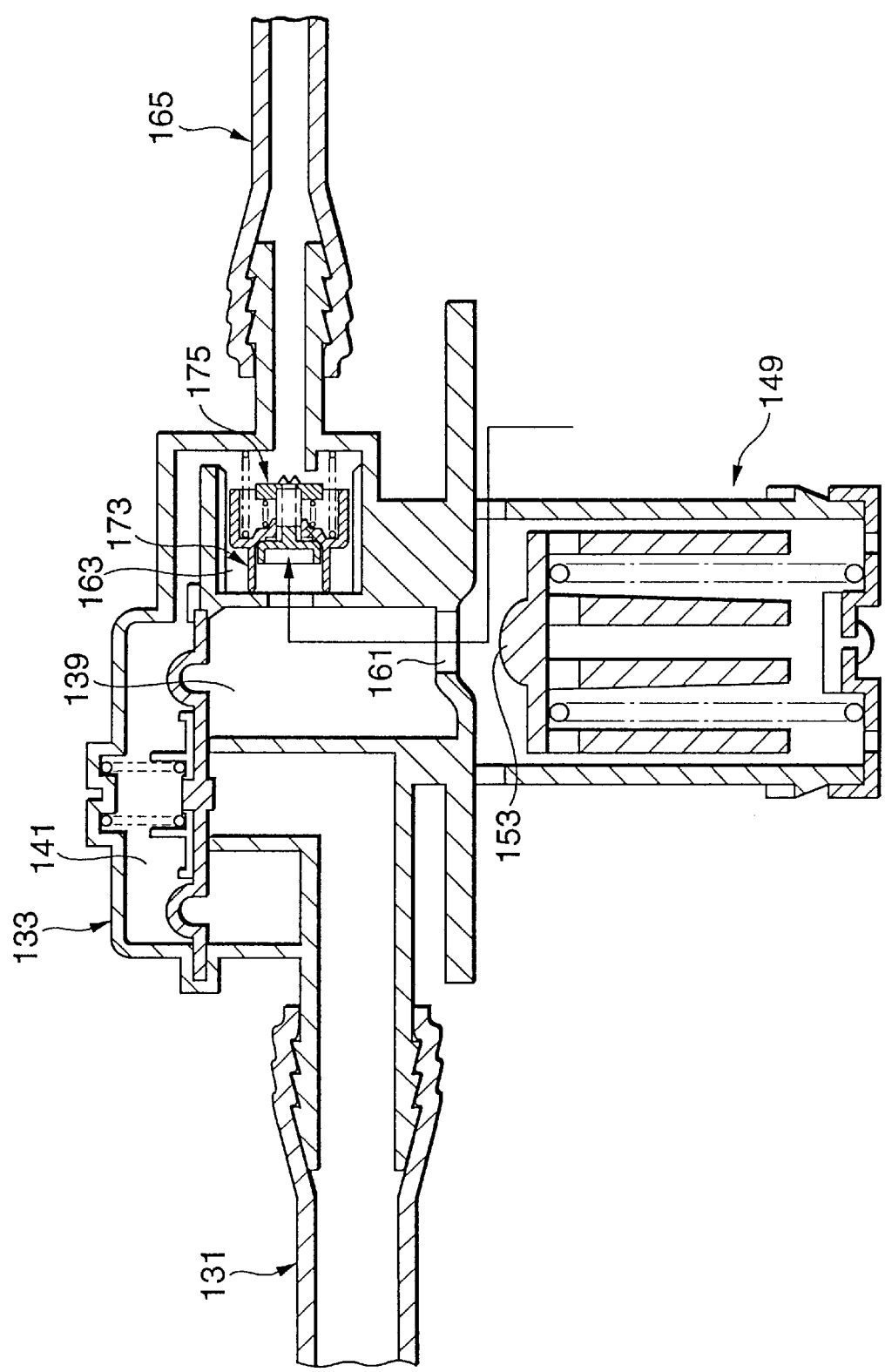
FIG. 11 is an explanatory view of the evaporation fuel discharge control device shown in FIG. 7, showing the state of the main portions thereof when a cap is removed.

And, when the cap 127 is removed from the fuel supply pipe 125 for fuel supply, as shown in FIG. 11, the positive and negative pressure valves 173 and 175 are respectively closed, which prevents the evaporation fuel from being introduced to the entrance portion 125a of the fuel supply pipe 125 through the pressure introduction passage 165 and from being discharged externally therefrom.

Figure 12:
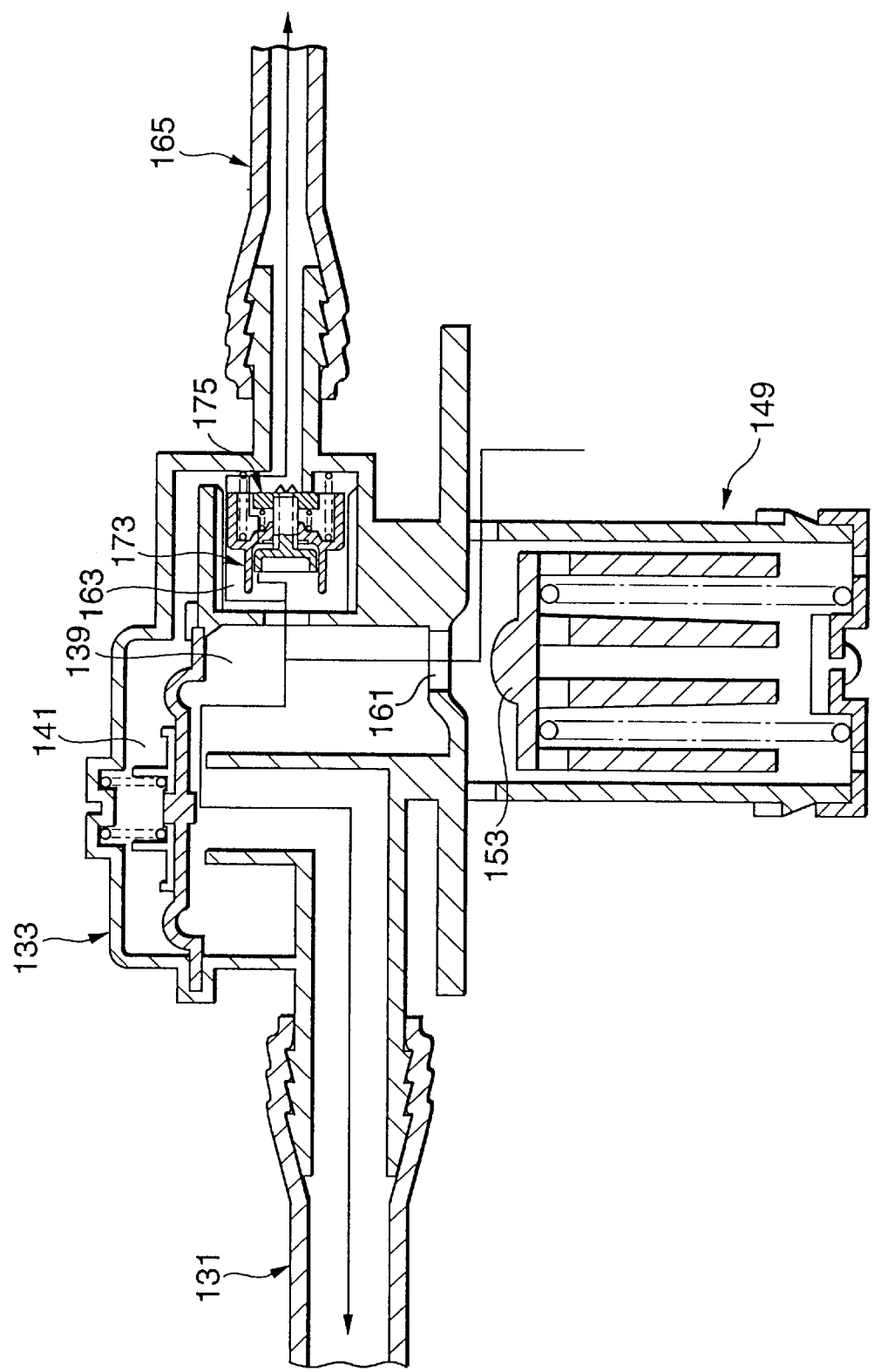
FIG. 12 is an explanatory view of the evaporation fuel discharge control device shown in FIG. 7, showing the state of the main portions thereof when fuel is supplied.
Figure 13:
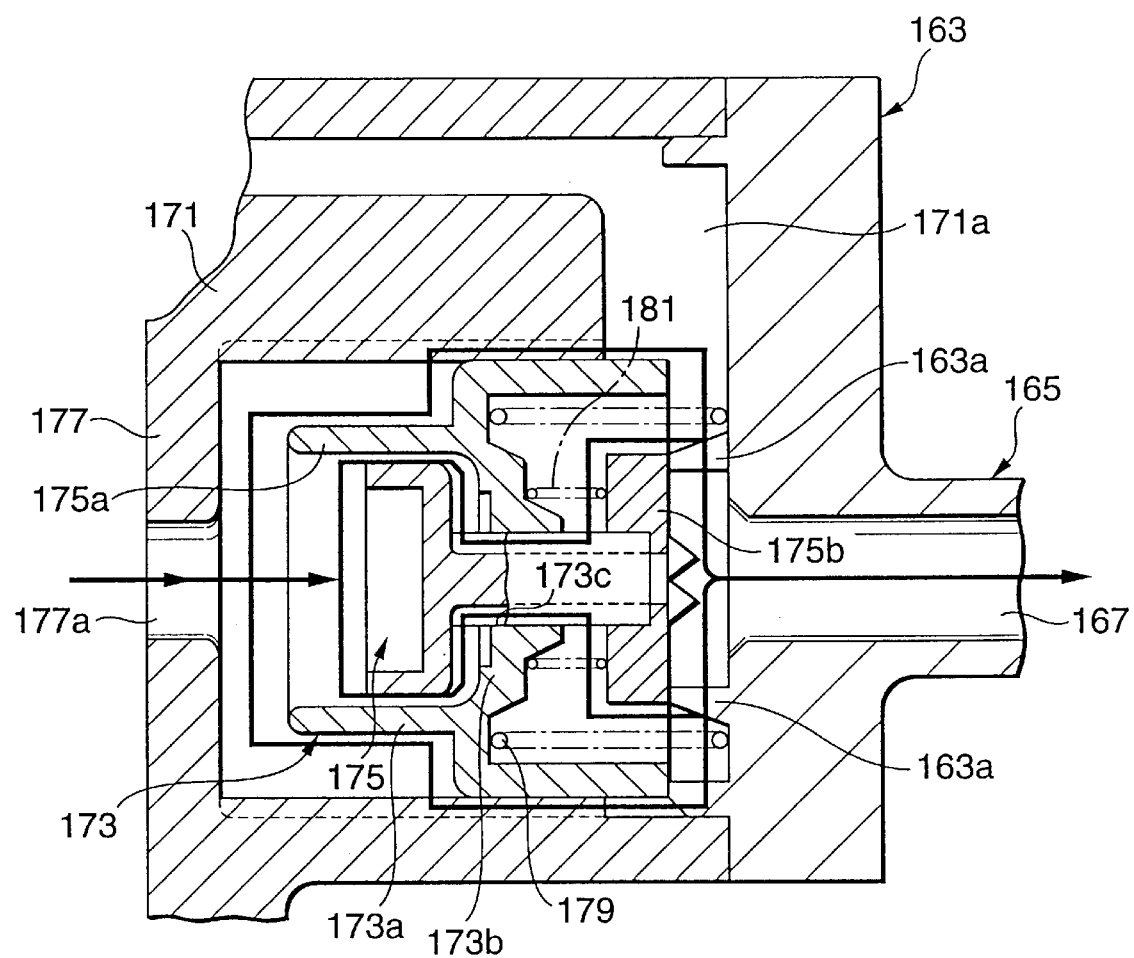
FIG. 13 is an explanatory view of the evaporation fuel discharge control device shown in FIG. 7, showing the state of the main portions thereof when fuel is supplied.

Next, if the internal pressure within the tank main body 123 is increased due to the start of fuel supply, then the pressure on the positive pressure chamber 139 side of the switch valve 133 becomes higher by a predetermined value or more than the pressure on the back pressure chamber 141 side thereof, so that, as shown in FIG. 12, the switch valve 133 is opened and the evaporation fuel from the tank main body 123 can be adsorbed by the canister 129 through the evaporation fuel passage 131.

And, at the then time, the pressure on the upstream side (positive pressure chamber 139 side) of the switch valve 133 becomes higher by a predetermined value or more than the pressure on the pressure introduction passage 165 side of the positive pressure valve 173 to thereby open the positive pressure valve 173, so that a part of the evaporation fuel within the tank main body 123 is introduced to the entrance portion 125a of the fuel supply pipe 125, and the evaporation fuel is returned back to the interior portion of the tank main body 123 together with the fuel that is supplied from the fuel supply gun or the like.

This prevents an increase in the amount of the evaporation fuel which could otherwise be caused by the fresh air introduced into the tank main body 123.

And, in the present embodiment, when the fuel is supplied in a high flow amount, the positive pressure valve 173 is moved beyond a given distance toward the passage 167 side due to the high pressure caused by the high flow amount of fuel supply, so that the energizing portion 175b of the positive pressure valve 175 is butted against the projecting portions 163a to thereby open the negative pressure valve 175.

As a result of this, the area of the passage is widened and thus, in the high flow amount of fuel supply, the circulating flow amount of the evaporation fuel toward the entrance portion 125a of the fuel supply pipe 125 increases to thereby reduce the amount of the air that is introduced into the tank main body 123 from the entrance portion 125a of the fuel supply pipe 125.

Figure 14:
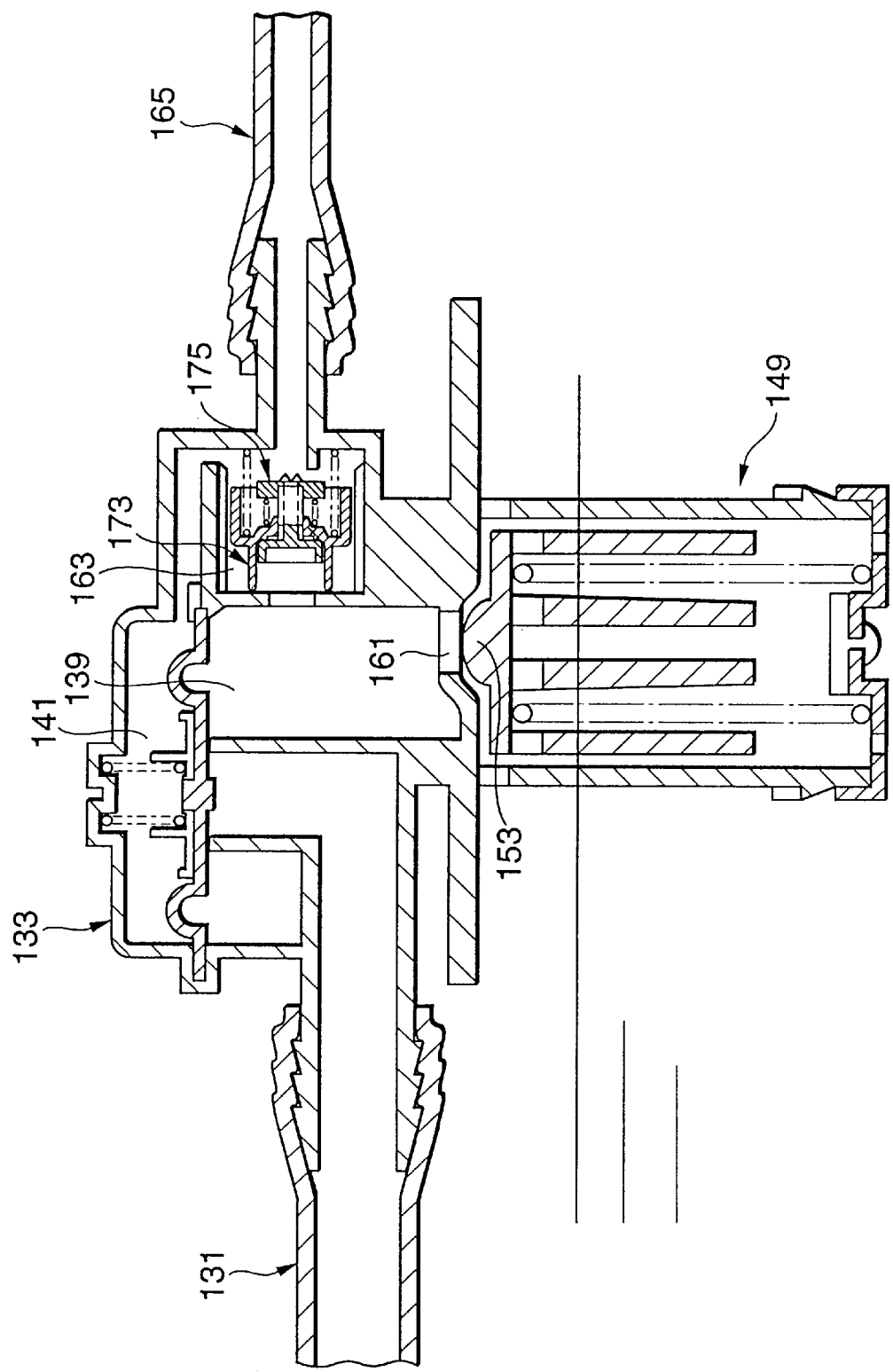
FIG. 14 is an explanatory view of the evaporation fuel discharge control device shown in FIG. 7, showing the state of the main portions thereof when the tank is full.

Next, if the tank main body 123 is filled with the fuel, as shown in FIG. 14, the entrance portion 161 of the evaporation fuel passage 131 is closed by the float valve 149.

And, if the cap 127 is mounted onto the fuel supply pipe 125 on completion of the fuel supply, then the pressure of the entrance portion 125a of the fuel supply pipe 125 increases up to the same level of the pressure within the tank main body 123, so that the pressures respectively on the back pressure chamber 141 side of the switch valve 133 and on the pressure introduction passage 165 side of the positive pressure valve 173 are caused to increase through the pressure introduction passage 165 and valve chamber 163.

At the same time, as the pressure on the upstream side (positive pressure chamber 139 side) of the switch valve 133 is lowered because the communication with the tank main body 123 is cut off by the float valve 149, the switch valve 133 and positive pressure valve 173 are closed.

Figure 15:
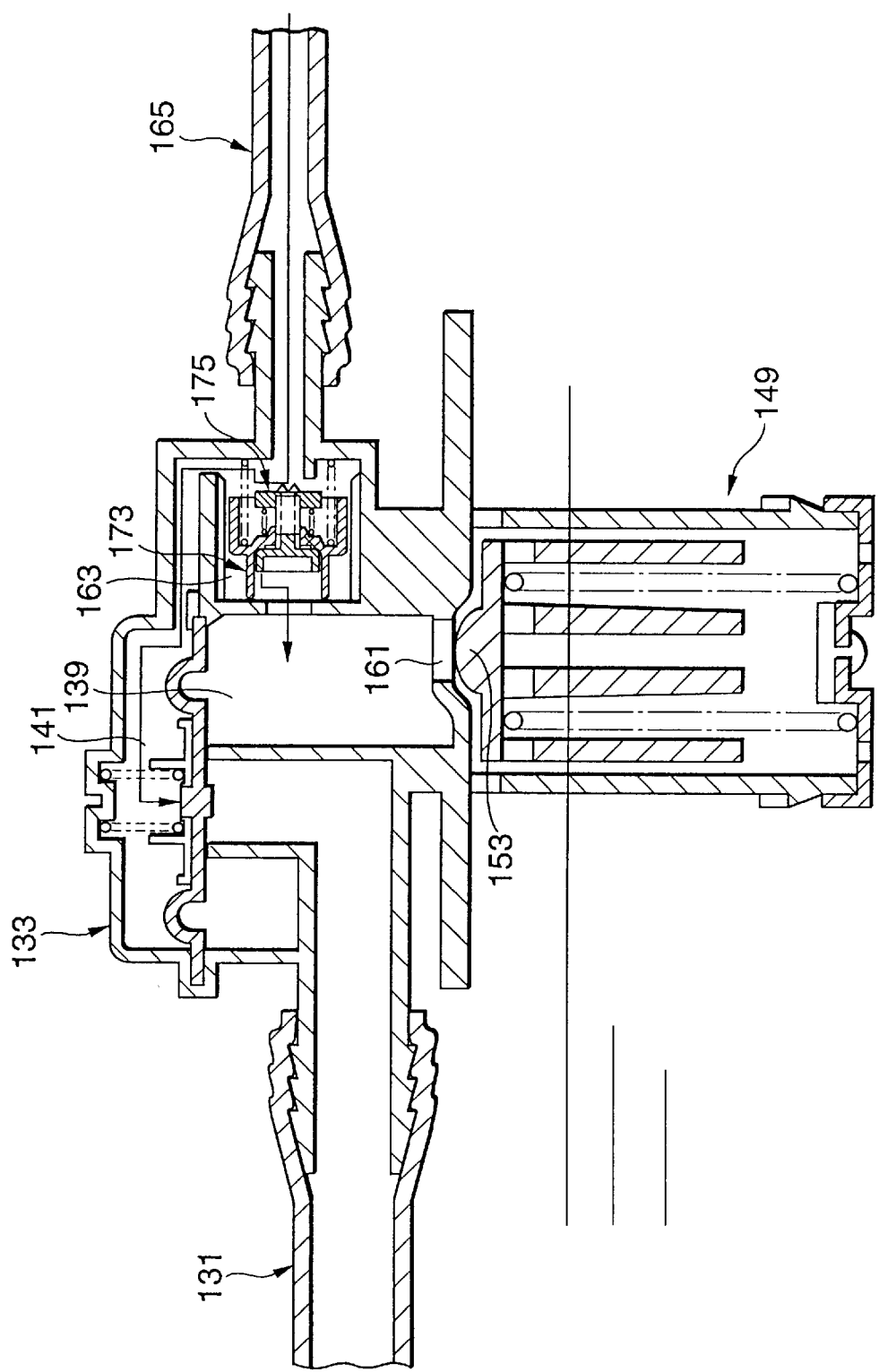
FIG. 15 is an explanatory view of the evaporation fuel discharge control device shown in FIG. 7, showing the state of the main portions thereof when the cap is mounted.

And, as shown in FIG. 15, due to the pressure given from the pressure introduction passage 165, the negative pressure valve 175 is opened and the pressure on the upstream side (positive pressure chamber 139 side) of the switch valve 133 is increased up to almost the same level as the pressure within the tank main body 123, thereby being able to remove the sticking of the float valve 149 to the entrance portion 161.

In the above-structured evaporation fuel discharge control device, as described above, on completion of the fuel supply, if the cap 127 is mounted onto the fuel supply pipe 125, then the pressure of the entrance portion 125a of the fuel supply pipe 125 increases up to the same level as the pressure within the tank main body 123. Due to the pressure given from the pressure introduction passage 165, the negative pressure valve 175 is opened and the pressure on the upstream side (positive pressure chamber 139 side) of the switch valve 133 is increased up to almost the same level as the pressure within the tank main body 123, thereby being able to remove the sticking of the float valve 149 to the entrance portion 161. That is, the present evaporation fuel discharge control device can prevent easily and positively the float valve 149 from sticking to the entrance portion 161 of the evaporation fuel passage 131.

Also, in the above-mentioned evaporation fuel discharge control device, the positive pressure valve 173 forming the first communicating means and the negative pressure valve 175 forming the second communicating means are respectively stored within the valve chamber 163 which is formed integrally with the switch valve 133, while the negative pressure valve 175 is disposed in the positive pressure valve 173. Therefore, the first and second communicating means can be structured without using pipes which are provided separately, so that the present evaporation fuel discharge control device can be made compact.

Further, in the above-mentioned evaporation fuel discharge control device, if the positive pressure valve 173 is moved beyond a given distance toward the passage 167 that is opened in the valve chamber 163 due to the high pressure in the high flow amount of fuel supply, then the energizing portion 175b of the negative pressure valve 175 is abutted against the projecting portions 163a to thereby open the negative pressure valve 175, the area of the passage can be expanded. Therefore, in the high flow amount of fuel supply, the circulating flow amount of the evaporation fuel toward the entrance portion 125a of the fuel supply pipe 125 is increased, thereby being able to reduce the amount of the fresh air that could be otherwise taken into the tank main body 123 from the entrance portion 125a of the fuel supply pipe 125.

This in turn can reduce the generation of vapor and also can reduce the size of the canister 129.

Figure 16:
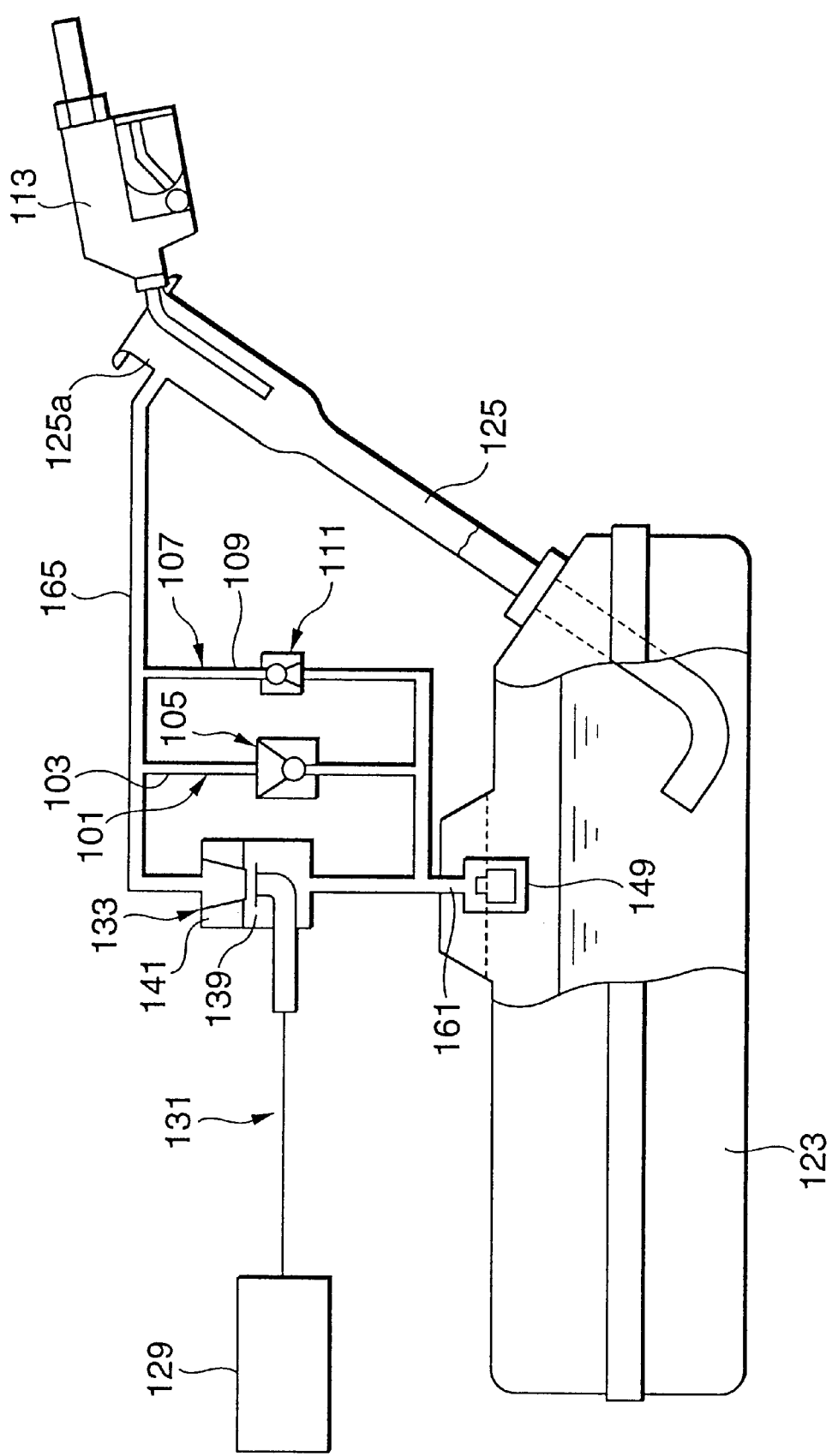
FIG. 16 is an explanatory view of a pipe arrangement system employed in another embodiment of an evaporation fuel discharge control device according to the invention.
Figure 17:
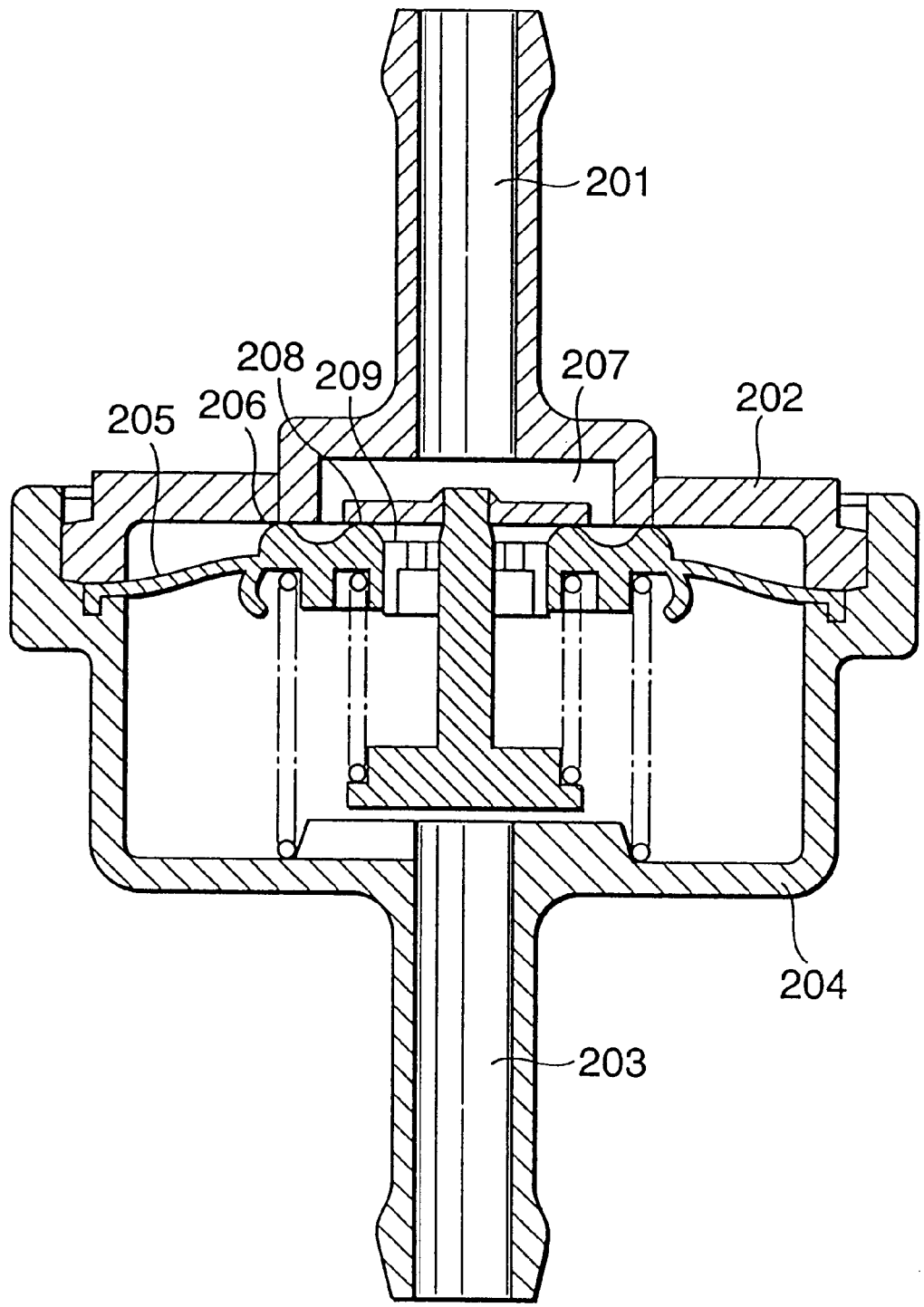
FIG. 17 is a longitudinal section view of a conventional pressure control valve.
Figure 18:
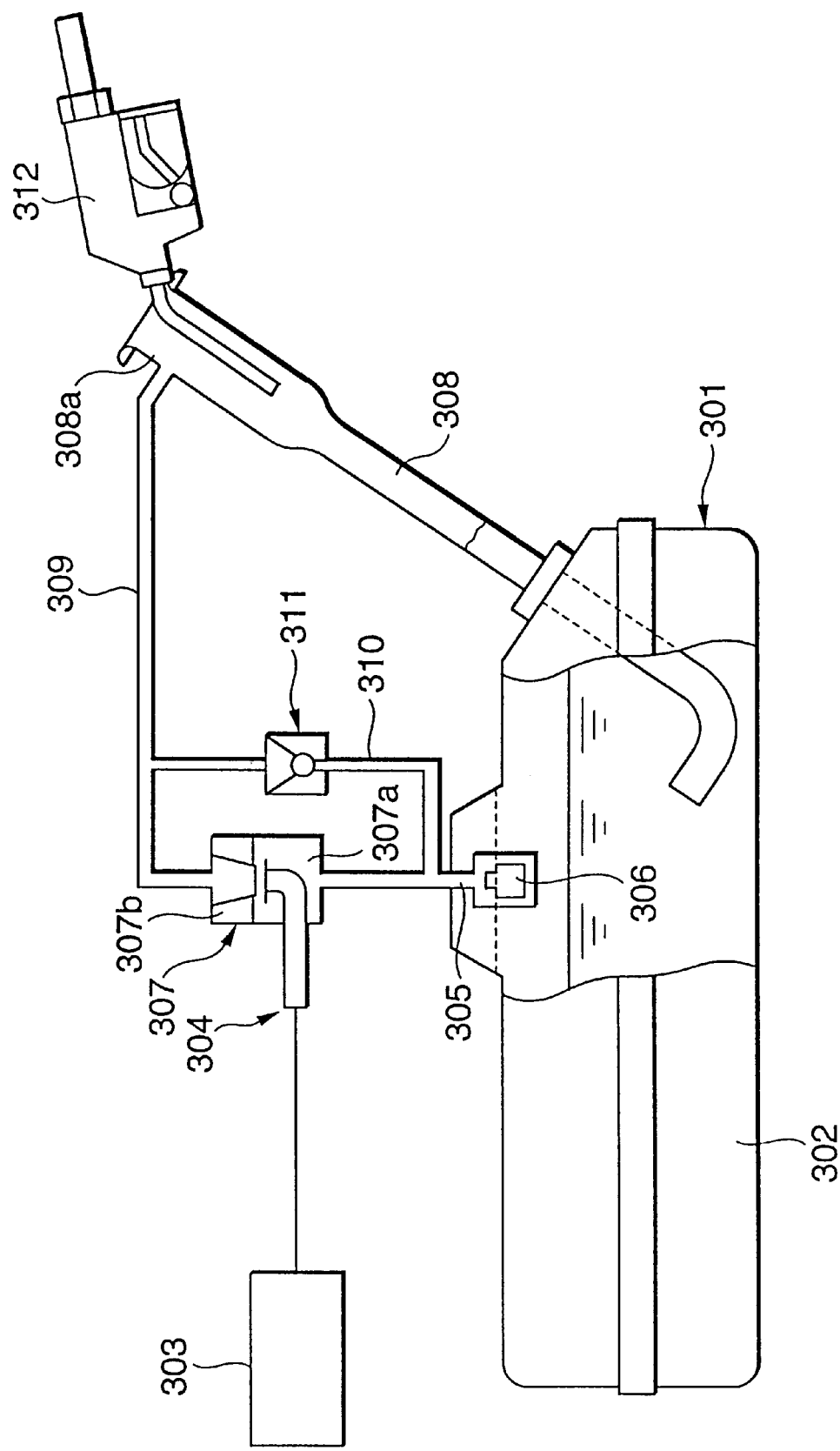
FIG. 18 is an explanatory view of a pipe arrangement system employed in a conventional evaporation fuel discharge control device.

Now, FIG. 16 shows another embodiment of an evaporation fuel discharge control device according to the invention and, in this embodiment, a tank main body 123 and a canister 129 are connected to each other through an evaporation fuel passage 131.

In particular, in the second embodiment, in the entrance portion 161 of the evaporation fuel passage 131, there is disposed a float valve 149 which is capable of closing the entrance portion 161 of the evaporation fuel passage 131 when the fuel within the tank main body 123 exceeds a given liquid level.

In the evaporation fuel passage 131, there is disposed a switch valve 133 which comprises a diaphragm valve.

The present switch valve 133 divides a positive pressure chamber 139 and a back pressure chamber 141, while the evaporation fuel passage 131 includes the positive pressure chamber 139 side of the switch valve 133.

And, when the pressure on the positive pressure chamber 139 side is higher by a predetermined value or more than the pressure on the back pressure chamber 141 side, the evaporation fuel passage 131 is opened.

Also, there is disposed a pressure introduction passage 165 in such a manner that it connects the entrance portion 125a of the fuel supply pipe 125 to the back pressure chamber 141 side of the switch valve 133.

And, in the present embodiment, there is disposed first communicating means 101 which allows the upstream side of the switch valve 133 to communicate with the pressure introduction passage 165 when the pressure on the upstream side of the switch valve 33 is higher by a given value or more than pressure on the pressure introduction passage 165 side thereof.

The first communicating means 101 includes a first communicating passage 103 which connects the upstream side of the switch valve 133 in the evaporation fuel passage 131 to the pressure introduction passage 165.

And, in the first communicating passage 103, there is disposed a first check valve 105 which can be opened when the pressure on the upstream side of the switch valve 133 is higher by a given value or more than the pressure on the pressure introduction passage 165 side.

Also, in the present embodiment, there is disposed a second communicating means 107 which allows the upstream side of the switch valve 133 to communicate with the pressure introduction passage 165 when the pressure on the pressure introduction passage 165 side is higher by a given value or more than the pressure on the upstream side of the switch valve 133.

The second communicating means 107 includes a second communicating passage 109 which connects the upstream side of the switch valve 133 in the evaporation fuel passage 131 to the pressure introduction passage 165.

And, in the second communicating passage 109, there is disposed a second check valve 111 which can be opened when the pressure on the pressure introduction passage 165 side is higher by a given value or more than the pressure on the upstream side of the switch valve 133.

In the evaporation fuel discharge device according to the present embodiment, in a car normal running operation, since the pressure of the interior portion of the tank main body 123 is equal to the pressure of the interior portion of the fuel supply pipe 125, the pressure on the pressure chamber 139 side of the switch valve 133 is equal to the pressure on the back pressure chamber 141 side thereof, so that the switch valve 133 is closed.

And, when the cap 127 is removed from the fuel supply pipe 125 for fuel supply, the first check valve 105 of the first communicating means 101 is closed, which can eliminate the possibility that the evaporation fuel can be introduced to the entrance portion 125a of the fuel supply pipe 125 through the pressure introduction passage 165 and discharged externally therefrom.

Next, if the internal pressure within the tank main body 123 is increased due to the start of the fuel supply, then the pressure on the positive pressure chamber 139 side of the switch valve 133 becomes higher by a predetermined value or more than the pressure on the back pressure chamber 141 side thereof, so that the switch valve 133 is opened and the evaporation fuel from the tank main body 123 can be adsorbed by the canister 129 through the evaporation fuel passage 131.

And, at the then time, the pressure on the upstream side (positive pressure chamber 139 side) of the switch valve 133 becomes higher by a predetermined value or more than the pressure on the pressure introduction passage 165 side of the check valve 105 disposed in the first communicating means 101, to thereby open the check valve 105 of the first communicating means 101, so that the evaporation fuel within the tank main body 123 is introduced to the entrance portion 125a of the fuel supply pipe 125, and the evaporation fuel is returned back to the interior portion of the tank main body 123 together with the fuel that is supplied from a fuel supply gun 113 or the like.

Thanks to the above, an increase in the amount of the evaporation fuel, which could be otherwise caused by introduction of the fresh air into the tank main body 123, can be prevented.

Next, if the tank main body 123 is filled up with the fuel, then the entrance portion 161 of the evaporation fuel passage 131 is closed by the float valve 149 and, if the pressure on the upstream side of the switch valve 133 is lowered, then the switch valve 33 and check valve 105 are closed respectively.

After then, if the cap 127 is mounted onto the fuel supply pipe 125 on completion of the fuel supply, then the pressure of the entrance portion 125a of the fuel supply pipe 125 increases up to the same level as the pressure within the tank main body 123 to thereby open the second check valve 111 of the second communicating means 107 through the pressure introduction passage 165, which increases the pressure on the upstream side of the switch valve 133 up to almost the same level to the pressure within the tank main body 123, thereby being able to remove the sticking of the float valve 149 to the entrance portion 161.

That is, according to the second embodiment as well, it is possible to prevent the float valve 149 from sticking to the entrance portion 161 of the evaporation fuel passage 131.

As has been described heretofore, according to a pressure control valve according to the present invention, since there is formed the flow passage expanding means which, when the positive pressure valve has moved to the second port side beyond a given distance, allows the first port side to communicate with the second port side, if the pressure on the first port side increases suddenly, then the positive pressure valve is moved to the second port side beyond a given distance to thereby allow the first port side to communicate with the second port side, so that the fluid or fuel from the first port side is allowed to flow to the second port through the respective flow passages of the positive and negative pressure values.

Therefore, when the pressure on the first port side increases suddenly, a large quantity of fluid can be made to flow to the second port side.

Also, if the pressure on the first port side increases suddenly, then the positive pressure valve is moved to the second port side together with the negative pressure valve, and, when the positive pressure valve has moved to the second port side beyond a given distance, the projecting portion of the casing is contacted with the energizing portion of the negative pressure valve to thereby allow the first port side to communicate with the second port side. Therefore, according to the present pressure control valve, the flow passage expanding means can be structured easily and positively.

Further, in the case that the first port is connected to the fuel tank side, while the second port is connected to the canister side, when the pressure within the fuel tank increases suddenly, the evaporation fuel within the fuel tank can be introduced to the canister side quickly.

As has been described heretofore, in an evaporation fuel discharge control device according to the present invention, on completion of oil supply, if the cap is mounted on the fuel supply pipe, then the pressure of the entrance portion of the fuel supply pipe increases up to the same level as the pressure within the tank main body, and thus the second communicating means is opened through the pressure introduction passage to thereby increase the pressure on the upstream side of the switch valve up to almost the same level as the same level as the pressure within the tank main body, thereby being able to remove the sticking of the float valve to the entrance portion of an evaporation fuel passage. That is, the present evaporation fuel discharge control device is able to prevent easily and positively the float valve from sticking to the entrance portion of the evaporation fuel passage.

Also, in the case that the positive pressure valve of the first communicating means and the negative pressure valve of the second communicating means are stored within the valve chamber which is formed integrally with the switch valve and the negative pressure valve is disposed in the positive pressure valve, the first and second communicating means can be structured without using a separately provided pipe, which makes it possible to make compact the present evaporation fuel discharge control device.

Further, if the positive pressure valve is moved, due to the high pressure used in the high flow rate of fuel supply, beyond a given distance toward the opening side of the pressure introduction passage which is opened in the valve chamber, then the negative pressure valve can be opened and the area of the passage toward the pressure introduction passage can be expanded by the passage expanding means and, therefore, in the high flow rate of fuel supply, the flow rate of the circulating evaporation fuel toward the entrance portion side of the fuel supply pipe is increased to thereby be able to reduce the amount of the fresh air taken into the fuel from the entrance portion of the fuel supply pipe.

And, thanks to the above, not only generation of the vapor can be reduced but also the canister can be made compact.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. An evaporation fuel discharge control device comprising:
   a canister for adsorbing evaporation fuel from a fuel tank having a tank main body with a fuel supply pipe;
   an evaporation fuel passage for connecting said tank main body and said canister;
   a float valve disposed within the tank main body for closing an entrance portion of said evaporation fuel passage when fuel within the tank main body exceeds a predetermined liquid level;
   a switch valve including a positive pressure chamber and a back pressure chamber, said evaporation fuel passage being disposed on a side of said positive pressure chamber, and said switch valve being structured such that the switch valve can be opened when a pressure on a side of said positive pressure chamber is higher by a predetermined value or more than a pressure on a side of said back pressure chamber;
   a pressure introduction passage for connecting an entrance portion of said fuel supply pipe to said back pressure chamber of said switch valve;
   first communicating means for allowing an upstream side of said switch valve to communicate with said pressure introduction passage when a pressure on the upstream side of said switch valve is higher by a predetermined value or more than a pressure on a side of said pressure introduction passage; and
   second communicating means for allowing the upstream side of said switch valve to communicate with said pressure introduction passage when the pressure on the side of said pressure introduction passage is higher by a predetermined value or more than the pressure on the upstream side of said switch valve.

2. An evaporation fuel discharge control device according to claim 1, wherein said first and second communicating means include a positive pressure valve and a negative pressure valve that are disposed within a valve chamber which is formed integrally with said switch valve, and said negative pressure valve is disposed in said positive pressure valve.

3. An evaporation fuel discharge control device according to claim 2, further including passage expansion means for opening said negative pressure valve when said positive pressure valve is moved beyond a predetermined distance toward an opening of said pressure introduction passage, said opening of said pressure introduction passage being opened in said valve chamber.

4. An evaporation fuel discharge control device according to claim 1, wherein the first communicating means includes a check valve disposed within a communicating passage, wherein the communicating passage connects the upstream side of the switch valve to the pressure introduction passage, and wherein the check valve is opened when the pressure on the upstream side of the switch valve is higher by the predetermined value or more than the pressure on the side of the pressure introduction passage.

5. An evaporation fuel discharge control device according to claim 1, wherein the second communicating means includes a check valve disposed within a communicating passage, wherein the communicating passage connects the upstream side of the switch valve to the pressure introduction passage, and wherein the check valve is opened when the pressure on the side of the pressure introduction passage is higher by a predetermined value or more than the pressure on the upstream side of the switch valve.

* * * * *